US012682506B2

(12) United States Patent
Mitchell et al.

(10) Patent No.: US 12,682,506 B2
(45) Date of Patent: Jul. 14, 2026

(54) FINE-TUNING IMAGES GENERATED BY ARTIFICIAL INTELLIGENCE BASED ON AESTHETIC AND ACCURACY METRICS AND SYSTEMS AND METHODS FOR THE SAME

(71) Applicant: T-Mobile USA, Inc., Bellevue, WA (US)

(72) Inventors: Michael Mitchell, North Bend, WA (US); Peter P. Myron, New Braunfels, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 226 days.

(21) Appl. No.: 18/350,673

(22) Filed: Jul. 11, 2023

(65) Prior Publication Data

US 2025/0022185 A1     Jan. 16, 2025

(51) Int. Cl.
| | |
|---|---|
| *G06T 11/00* | (2026.01) |
| *G06T 7/00* | (2017.01) |
| *G06T 7/50* | (2017.01) |
| *G06V 10/56* | (2022.01) |
| *G06V 10/60* | (2022.01) |
| *G06V 10/74* | (2022.01) |
| *G06V 20/70* | (2022.01) |

(52) U.S. Cl.
CPC ............ *G06T 11/00* (2013.01); *G06T 7/0002* (2013.01); *G06T 7/50* (2017.01); *G06V 10/56* (2022.01); *G06V 10/60* (2022.01); *G06V 10/761* (2022.01); *G06V 20/70* (2022.01); *G06T 2207/30168* (2013.01)

(58) Field of Classification Search
CPC ............................. G06T 13/40; G06K 9/00315
USPC ......................................................... 345/581
See application file for complete search history.

(56) References Cited

U.S. PATENT DOCUMENTS

| | | |
|---|---|---|
| 7,826,657 B2 | 11/2010 | Zhang et al. |
| 7,859,543 B2 | 12/2010 | Salvador |
| 8,090,212 B1 | 1/2012 | Baxansky et al. |
| 8,285,052 B1 | 10/2012 | Bhattacharyya et al. |
| 8,594,385 B2 | 11/2013 | Marchesotti et al. |
| 8,712,157 B2 | 4/2014 | Marchesotti et al. |
| 8,744,119 B2 | 6/2014 | Shuster |
| 9,135,493 B2 | 9/2015 | Shuster |
| 9,659,384 B2 | 5/2017 | Shaji et al. |

(Continued)

FOREIGN PATENT DOCUMENTS

| | | |
|---|---|---|
| CN | 111542896 A | 8/2020 |
| CN | 109417605 B | 2/2021 |

(Continued)

*Primary Examiner* — Samantha (Yuehan) Wang
(74) *Attorney, Agent, or Firm* — Perkins Coie LLP

(57) ABSTRACT

Systems and methods for improving generated images based on image accuracy and aesthetics are disclosed herein. For example, an image tuning system can receive an image generation prompt describing a first image. The system can generate a second image. The system can compute an accuracy metric and an aesthetic metric. The system can determine whether the accuracy metric and aesthetic metric are less than respective thresholds. The system can generate a seed artifact. The system can generate a third image approximating the first image based on the seed artifact. The system can transmit the third image for display at a user interface.

20 Claims, 7 Drawing Sheets

(56) References Cited

U.S. PATENT DOCUMENTS

| | | | |
|---|---|---|---|
| 9,715,508 B1 | 7/2017 | Kish et al. | |
| 9,721,144 B2 | 8/2017 | Shuster | |
| 9,836,840 B2 | 12/2017 | Fonte et al. | |
| 9,852,158 B2 | 12/2017 | Kish et al. | |
| 10,002,415 B2 | 6/2018 | Shen et al. | |
| 10,354,171 B2 | 7/2019 | Hsieh et al. | |
| 10,515,443 B2 | 12/2019 | Shen et al. | |
| 10,878,550 B2 | 12/2020 | Shen et al. | |
| 11,069,030 B2 | 7/2021 | Shen et al. | |
| 12,205,207 B2 * | 1/2025 | Smetanin | G06F 3/0482 |
| 2008/0317358 A1 | 12/2008 | Bressan et al. | |
| 2020/0242774 A1 * | 7/2020 | Park | G06N 3/084 |
| 2021/0350504 A1 | 11/2021 | Shen et al. | |
| 2022/0375088 A1 | 11/2022 | Shah et al. | |
| 2022/0391641 A1 | 12/2022 | Ivanov et al. | |
| 2023/0134337 A1 | 5/2023 | Li et al. | |
| 2024/0295953 A1 * | 9/2024 | Zakharov | G06T 11/00 |

FOREIGN PATENT DOCUMENTS

| | | | |
|---|---|---|---|
| CN | 106464811 B | 3/2021 |
| CN | 112509120 A | 3/2021 |
| CN | 107580470 B | 6/2021 |
| CN | 113785324 A | 12/2021 |
| CN | 113227764 B | 8/2022 |
| EP | 3257016 A1 | 12/2017 |
| EP | 3496526 A1 | 6/2019 |
| EP | 3751453 A1 | 12/2020 |
| EP | 3664026 B1 | 2/2022 |
| JP | 5928753 B2 | 5/2016 |
| JP | 2017516204 A | 6/2017 |
| JP | 2018502279 A | 1/2018 |
| JP | 6505513 B2 | 4/2019 |
| JP | 6656331 B2 | 2/2020 |
| JP | 2021506541 A | 2/2021 |
| JP | 7046119 B2 | 3/2022 |
| KR | 20200115489 A | 10/2020 |
| KR | 102398256 B1 | 5/2022 |
| KR | 102471379 B1 | 11/2022 |
| WO | 2012092132 A2 | 7/2012 |
| WO | 2016120441 A2 | 8/2016 |
| WO | 2016130879 A1 | 8/2016 |
| WO | 2018026741 A1 | 2/2018 |
| WO | 2019114147 A1 | 6/2019 |
| WO | 2021216476 A1 | 10/2021 |
| WO | 2022261472 A1 | 12/2022 |

* cited by examiner

100

Network 102

Server 106

Image Tuning System 114

Servers 104

Network Access Node 108-2

Network Access Node 108-1

Satellite 112

Electronic Device 110

500

FINE-TUNING IMAGES GENERATED BY ARTIFICIAL INTELLIGENCE BASED ON AESTHETIC AND ACCURACY METRICS AND SYSTEMS AND METHODS FOR THE SAME

BACKGROUND

A text-to-image model is a machine learning model that takes as input a natural language description and produces an image matching that description. Such models began to be developed in the mid-2010s as a result of advances in deep neural networks. Text-to-image models generally combine a language model, which transforms the input text into a latent representation, and a generative image model, which produces an image conditioned on that representation. Some text-to-image models have generally been trained on image and text data scraped from the web.

BRIEF DESCRIPTION OF THE DRAWINGS

Detailed descriptions of implementations of the present invention will be described and explained through the use of the accompanying drawings.

Figure 1:
FIG. 1 is a block diagram that illustrates an example of a computer system environment in which at least some operations described herein can be implemented.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Methods and systems disclosed herein relate to improving image generation based on text-based prompts in an iterative manner by evaluating the accuracy and aesthetics of generated images. For example, disclosed systems generate an improved image by calculating an accuracy metric and an aesthetic metric that characterize the quality of an image generated based on a text prompt via an image generation model. In some implementations, the system generates a quality metric based on the accuracy metric and aesthetic metric. By comparing the quality metric with a threshold value, the system can determine whether to refine the image by generating an improved prompt or a seed image to input into the image generation model. Thus, the system can iteratively generate images with improved accuracy and aesthetics by refining the inputs provided to the model, thereby enabling the generation of more aesthetically pleasing images without human intervention or evaluation.

In conventional systems, image generation systems can include neural networks or other machine learning models (e.g., diffusion models) for generation of an image from an input prompt, such as a text string or a corresponding vector representation. Conventional systems may be trained using previous images and matching labels with little further contextual information beyond an associated description. Furthermore, such conventional systems may generate the output image using only words within the input prompt. Thus, conventional text-to-image systems may not be capable of improving upon generated images without regenerating an image, often from scratch, with a human-modified prompt. In particular, text-to-image generators may generate images that may nominally represent objects or ideas within the input prompt but may exhibit displeasing aesthetic features, such as improper focus, lighting, depth of field, positioning, color, and the like. For example, while a conventional text-to-image system may generate an image with objects included in a prompt, such objects may be in the wrong position, have an unsuitable shape, or exhibit subjectively unpleasant features, such as facial distortions.

The presently disclosed systems and methods solve these and other problems associated with text-to-image generators. To do so, the systems disclosed herein evaluate both an accuracy value and an aesthetic value of images generated from a text-to-image generator using, for example, an image classification convolutional neural network (CNN). By evaluating images after generation, the system can identify one or more areas of deficiencies in the generated image(s) and process the generated image(s) or prompt(s) further to improve upon the identified areas. As an illustrative example, the system enables evaluation of the lighting, contrast, focus, and/or stylistic theme of an image, in addition to whether the image satisfies all (or most) of the required elements of the prompt. Upon detecting a deficiency in the image, such as an extra number of fingers on a human's hand, the system can generate corresponding accuracy and aesthetic metrics that trigger generation of a new image, such as through a modified prompt or by inputting additional context relating to the generated image into the text-to-image generator. By doing so, the system can correct for improper aesthetics within an image by detecting when such aesthetics are undesirable while ensuring that the image is still accurate and consistent in the context of the initial text prompt. As such, considering both accuracy and aesthetics enables the system to improve on the subjective or stylistic elements of images generated from text prompts while ensuring the continued accuracy of the image over multiple iterations of improvements.

Methods and systems disclosed herein can receive image generation prompts, such as text strings that describe a requested image. The system can generate a second image approximating the requested image by applying an image generation model to the prompt, such as a stable diffusion model. Once the corresponding image is generated, the system can evaluate both the accuracy and aesthetics of the generated second image in relation to the image generation prompt to determine respective metrics. For example, if either the computed accuracy metric or the aesthetic metric is less than or equal to respective threshold metrics, the system can prepare an input for generation of subsequent images based on these metrics. As an illustrative example, in the case that the system detects a deficient aesthetic metric due to the exclusion of certain stylistic features (e.g., an agreeable facial expression), the system can generate a new seed artifact that includes language describing the missing element. The system can input the seed artifact into the image generation model, such as by modifying an image generation prompt with a description of the missing element. For example, the system can modify a text prompt with a text description of the missing element. Additionally or alternatively, the image generation prompt can include non-text data, such as audio prompts, video prompts, or gestures. The system can then generate a new image based on this modified/new seed artifact. Thus, the system can iteratively improve images generated by text-to-image generators with minimum and/or no human intervention or supervision.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Image Generation Environment

FIG. 1 is a block diagram that illustrates an example of a computer system environment 100 in which at least some operations described herein can be implemented. As shown, the computer system environment 100 can include a network 102 associated with server(s) 104 and/or 106. The network 102 and any associated devices can communicate with one or more network access nodes 108-1 or 108-2, which can, in turn, communicate with one or more electronic devices, such as an electronic device 110. In some implementations, the electronic device 110 can interface with other devices or systems, such as a satellite 112. As such, the computer system environment 100 enables client devices, such as the electronic device 110, to communicate and make requests with other systems, such as the servers 104 or 106, through the appropriate network links.

Figure 6:
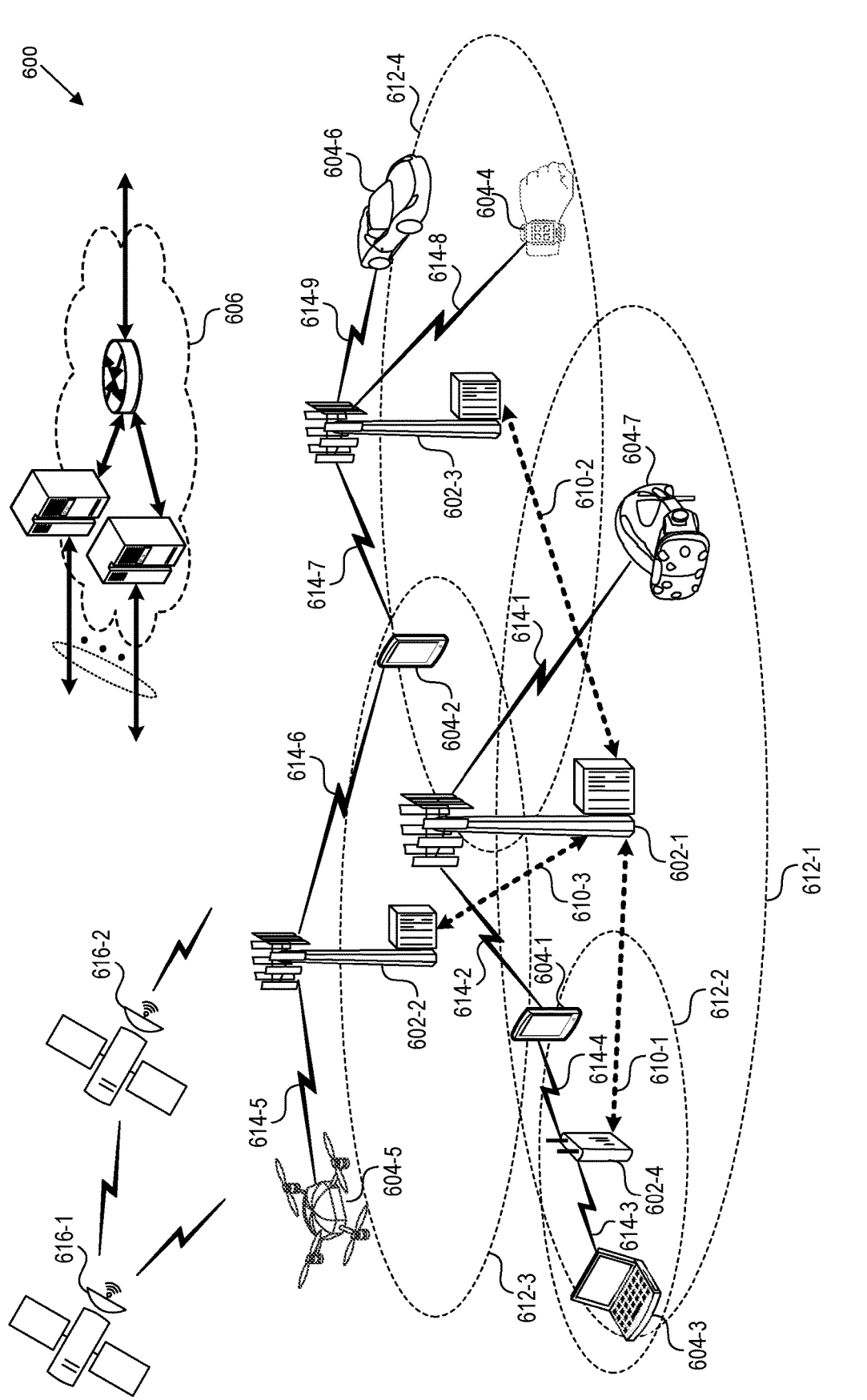
FIG. 6 is a block diagram that illustrates a wireless communications system that can implement aspects of the present technology.

The network 102 can include one or more devices, as discussed in relation to FIG. 6. For example, the network 102 can include devices capable of hosting the servers 104 and/or 106, such as computing clusters, network nodes, or other hardware devices. In some embodiments, the servers 104 and 106 may include services that are accessible by client devices, such as the electronic device 110. For example, the electronic device 110 can generate a request for an image generation task, including a corresponding text string prompt describing a requested image. The electronic device 110 can transmit this request to the network 102 through the network access nodes 108-1 or 108-2. As such, the servers 104 or 106 can process the request to generate the requested image, which can be transmitted back to the electronic device 110 for further evaluation, processing, or use.

For example, the servers 104 and/or 106 may include an image tuning system 114. Some servers within the network 102 can be associated with each other; for example, servers 104 can be managed by the same entity. One or more of the servers 104 can communicate with each other using a local area network (LAN). Additionally or alternatively, the servers within the network 102 can be managed by different entities and may be associated with each other only through a network 102 (e.g., a wide area network). For example, the server 106 can include the image tuning system 114, which can generate images and process them through a text-to-image generation system. In some implementations, data for training the text-to-image generation system and/or the image tuning system can be accessed or retrieved from one or more of the servers 104. As such, the image tuning system can leverage data, processes, or programs from multiple servers within the network 102 for improving the quality of images requested by a client device (e.g., the electronic device 110).

The computer system environment 100 can include any combination of network access nodes (NANs) including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point. The network access nodes 108-1 and/or 108-2 enable devices to communicate with the network 102, even if they are external to the network. For example, the satellite 112 can communicate with devices associated with the network 102 through the electronic device 110 and/or the network access nodes 108-1 or 108-2. By enabling the electronic device 110 to communicate with the network 102, the computer system environment 100 enables users to submit requests to the servers 104 and/or 106 for image processing tasks. Thus, even users that are not directly affiliated with the network 102 can submit text-to-image generation requests, and thus, the computing system environment 100 enables improved utilization and accessibility of the image tuning system.

For example, the electronic device 110 can include wireless devices, such as those discussed in relation to FIG. 6. For example, the electronic device 110 can include a user input interface, such as a keyboard, voice-to-text generator, or a touchscreen for handwriting recognition. By receiving such inputs from a user, the electronic device 110 can accept requests for artificial intelligence-generated images based on text prompts. For example, a user can input a prompt for a portrait of a particular object with a particular background into the electronic device 110, which can transmit the request through the network access nodes 108-1 or 108-2 to the image tuning system 114 associated with the server 106 (or, in some implementations, the multiple servers 104) on the network 102. Additionally or alternatively, the electronic device 110 can accept different types of inputs, such as pictures (e.g., as through an integrated camera) or audio files, which can be transmitted to the network 102 as input for the image tuning system. By providing a robust, flexible interface for users, the electronic device 110 improves the ability for users to interact with the image tuning system, thereby improving its accessibility and broadening its functionality.

In some implementations, the image tuning system associated with the network 102 can generate images, text, audio, or other media/signals for output on the electronic device 110, such as through a corresponding user interface, speakers, haptic devices, and/or other output media. As an illustrative example, the image tuning system can generate output on a user interface that includes a point of human-computer interaction and communication in a device. A user interface can include a human-machine interface that interfaces machines with physical input hardware, such as keyboards, mice, and game pads or computer monitors, speakers, and printers. The user interface can display results generated by the image tuning system, including images generated by an associated text-to-image generator. For example, the user interface can provide the results through a graphical user interface associated with the electronic device 110. Alternatively or additionally, the image tuning system can provide the output to any other systems that may receive outputs. For example, the image tuning system can output audio data, which can be broadcast wirelessly, transmitted to user devices, or sent to another system for further processing. In some implementations, the output can include vibrations (e.g., through haptic devices), video (e.g., multiple image frames), audio, 3D-printed sculptures or structures, or a combination thereof. As such, the electronic device 110 can receive information and data from the network 102 and any associated devices or systems, thereby enabling the image tuning system to provide results and contextual information back to a requesting user.

Image Tuning System

Figure 2:
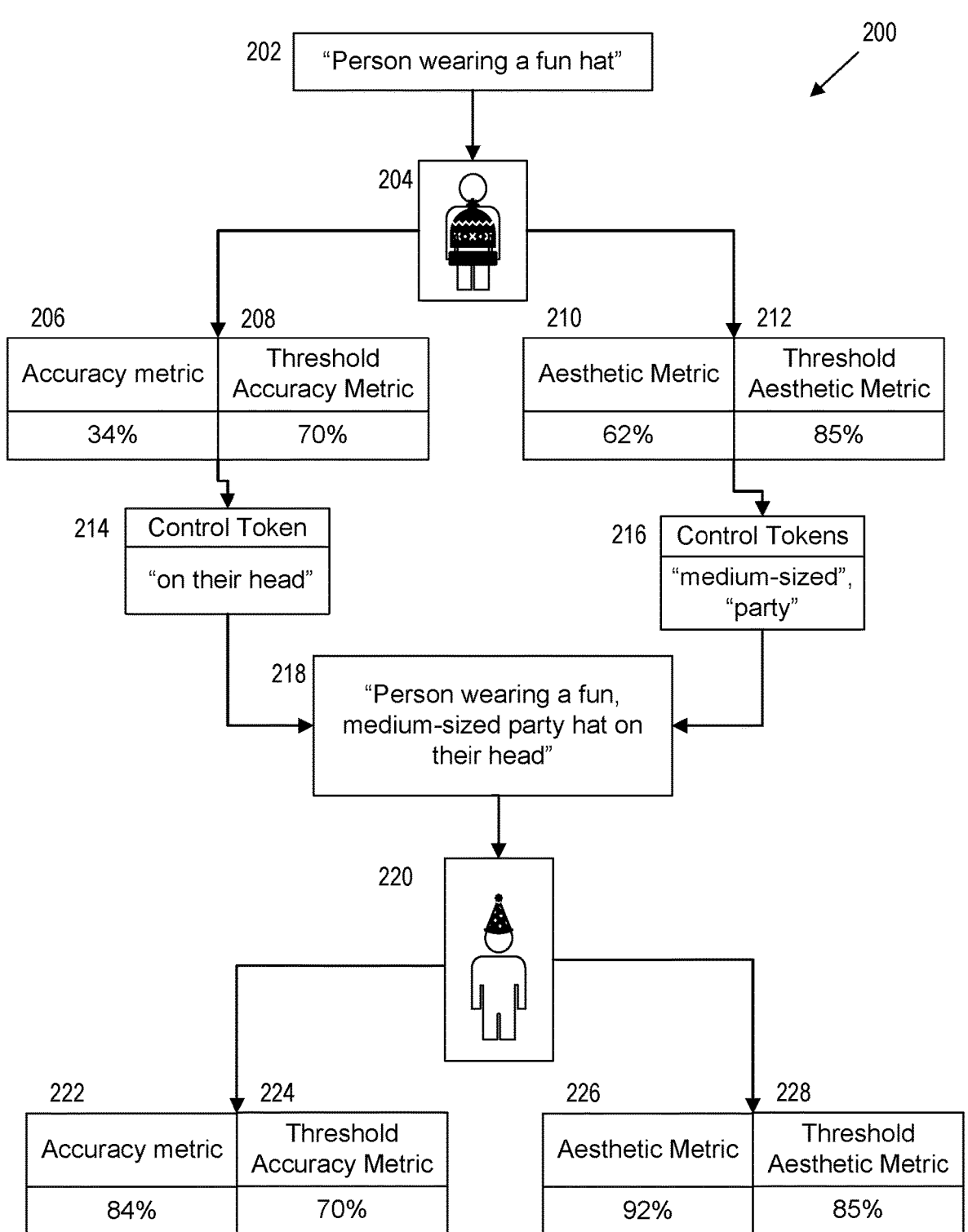
FIG. 2 is a block diagram that illustrates using seed artifact generation based on accuracy and aesthetic metrics to generate improved images, in accordance with one or more embodiments described herein.

FIG. 2 is a block diagram that illustrates a process 200 using seed artifact generation based on accuracy and aesthetic metrics to generate improved images, in accordance with one or more embodiments described herein. For example, FIG. 2 describes a process 200 for generating and tuning images based on input prompts, such as text prompts. The image tuning system can generate images based on users' prompts and evaluate these images for their accuracy and aesthetics. Based on these evaluations, the image tuning system can continue to improve images based on their accuracy and/or aesthetic value, thereby improving the quality of output images.

For example, the image tuning system 114 receives an image generation prompt 202. As demonstrated in FIG. 2, the image generation prompt 202 can include a request from a user for a generated image corresponding to a "person wearing a fun hat." An image generation prompt can include any indication of a requested image. For example, an image generation prompt includes a text string (e.g., a string of alphanumeric and/or non-alphanumeric characters) with natural language describing the nature of the image requested by a user. The alphanumeric text corresponding to the image generation prompt 202 can include words, sentences, phrases, or paragraphs of description. Additionally or alternatively, the image generation prompt can include numbers or non-alphanumeric symbols to enable improved description of any requested images.

In some implementations, the image generation prompt can include non-text data, such as images, videos, or audio. As an illustrative example, the image generation prompt 202 can include a text description of a requested image, along with a base image to be modified by the image tuning system. The user, for example, can submit the image generation prompt 202 in FIG. 2 along with a portrait image of a specific person, such that the image tuning system can generate a new image with the specific person with a newly generated depiction of a fun hat.

In some implementations, the image generation prompt 202 can include descriptive tokens. A token can include any subunit of the image generation prompt 202, such as a word, phrase, or idea associated with the image generation prompt. A descriptive token can include a token that describes one or more aesthetic properties for an image requested by the user. For example, the image generation prompt 202 includes a descriptive token such as the word "fun," which describes an aesthetic, subjective, and/or emotional quality of the image requested by the user. An aesthetic quality can include any indication of a trait, characteristic, or attribute of an object (e.g., an image) that characterizes the pleasing nature or appearance of the image in a subjective manner.

In some implementations, the image generation prompt can include descriptions, instructions, or requests in media other than text. For example, the image generation model associated with the image tuning system can accept audio recordings, video recordings, hardware button signals (e.g., button combinations on a mobile device), or any other signal that can represent an image or other output requested by a user. As an illustrative example, the image tuning system receives an audio recording as an image generation prompt, where the audio recording includes human speech describing a requested image. In some implementations, the image tuning system converts the human speech to text using a text-to-speech or speech recognition engine prior to providing the text prompt to the image generation model. Additionally or alternatively, the image generation model accepts audio recordings themselves. For example, the image generation model can accept a recording of a sound of a train passing for generation of an image corresponding to a train making a similar sound. By accepting a variety of inputs for generation of outputs, the image tuning system enables flexibility in the tuning tasks performed.

In some implementations, the image tuning system 114 receives negative image generation prompts, such as descriptions, text, or expressions of objects, features, or qualities that are undesired in the requested image. The image tuning system 114 can receive a text string indicating that a requested image should avoid "poorly drawn hands" or "disfigured body parts." In some implementations, the system detects undesired elements in a generated image. The image tuning system 114 can subsequently generate the control token or seed artifact to include indications of these undesired elements within a negative prompt. Alternatively or additionally, the user may, through the user device, select an option or field for adding a negative prompt for submission to the image tuning system 114. Negative prompts can include indications of aesthetic-based or accuracy-based qualities that are undesired in the requested media. For example, a negative prompt includes aesthetic information relating to an unwanted color, mood, or style within the image. Additionally or alternatively, a negative prompt includes information relating to the accuracy of the image, such as a request for an absence of an object or person within the image. By receiving such information relating to undesired elements, the image tuning system 114 can improve the aesthetic quality or accuracy of the image based on user input or iteratively.

In some implementations, the image tuning system can accept multiple prompts for generation of a single output (or a single related collection of outputs). For example, the image tuning system can accept multiple text prompts arising from different users and generate one or more corresponding images through the image generation model. As an illustrative example, the image tuning system can concatenate text strings corresponding to the various prompts from different users and input the concatenated string into the image generation model as input. Additionally or alternatively, such as in the case of conflicting prompts, the image tuning system can weigh each received prompt based on user-based information or criteria, such as based on subscription status. For example, a prompt from a user who has been a subscriber in the system for longer may be chosen as an input to the image generation model preferentially to a prompt from a new user who has not been a subscriber for as long. In some cases, the image tuning system may determine a ranking or a metric for each user based on the user's subscription status and/or other user attributes. Thus, the image tuning system can determine which prompt to prioritize for image generation based on the ranking or the metric. Furthermore, in some cases, the image tuning system can predict which prompts may generate more aesthetically pleasing or accurate results (e.g., by predicting an accuracy or aesthetic metric associated with each input prompt) and choose a corresponding prompt accordingly. As such, the image tuning system can generate images corresponding to multiple users, thereby powering collaboration and idea-sharing with respect to generation of artificial intelligence-generated images.

The image tuning system 114 can obtain the image generation prompt 202 from the electronic device 110 through, for example, network access nodes 108-1 or 108-2. As an illustrative example, an image generation model (as described in relation to FIG. 3) can output a second image 204 based on the image generation prompt 202 requesting a first image. For example, the second image 204 includes a person and a warm hat based on the image generation prompt 202 requesting a person wearing a fun hat. The image can include digital representations of picture elements (e.g., pixels) in the form of a data structure, such as an array. For example, generated images have a standardized format, such as the Joint Photographic Experts Group (JPEG), Portable Network Graphics (PNG), Tag Image File Format (TIFF), graphics interchange format (GIF), or bitmap (BMP) formats. In some implementations, the image generation model outputs multiple images based on one or more input prompts. For example, the image generation model outputs a series of image frames, such as frames associated with a video. The image generation model can output the series of image frames with an associated audio track, as in an audiovisual data format. Images output by the image tuning system and/or the image generation model can include three-dimensional images, such as structures for 3D printing, laser cutting, CNC milling, etc. Such 3D images can include data in 3D file formats, such as in STP, MAX, 3DS, FBX, OBJ, X3D, VRML, or STL formats. In some implementations, the image tuning system 114 can generate or obtain a vector representation of an image. For example, the image tuning system 114 can generate a vector (e.g., an array of values) that represents the information within the image. The vector representation can include a list of pixel values from the corresponding image—that is, a color histogram. A vector representation can include vector graphics, such as images with scalable vector graphics (SVG) or other formats that include definitions of geometric shapes defined on a Cartesian plane. By generating representations of digital images based on text prompts, the image tuning system 114 enables further processing and/or transmission of the image to the user or other evaluation models, improving the flexibility of the system for improving and tuning the generated images further.

The image tuning system 114 can utilize an image labeling model to generate labels for images. For example, the image labeling model generates labels that describe images generated with the image generation model based on the image generation prompt 204. A label can include an indication, identification, or marking of specific details in an image. For example, a label can include indications of object classes associated with data within an image. As an illustrative example, the image labeling model outputs one or more labels (e.g., tokens) associated with the second image 204, such as the words or phrases "person," "winter hat," and "sweater." The image labeling model can, for example, include artificial neural networks, support vector machines, decision trees, convolutional neural networks, or any machine learning algorithms for generating the labels. The image labeling model can be trained with training images and corresponding image descriptions. For example, the image tuning system can generate training images and corresponding image descriptions through the users' prompts and any generated or provided images, thereby enabling further improvement or training of the image labeling model. In some embodiments, the image tuning system 114 receives updates, patches, or updated training data periodically or on occasion. For example, such updated training data includes information relating to styles, colors, or preferences due to changing aesthetic standards or norms. The image tuning system 114 can receive images of new types of architecture, fashion, or photography styles. Based on these training images, as well as corresponding labels, the image tuning system 114 and/or image generation model can train based on these training images and corresponding labels to improve the quality of image generation and evaluation, thereby preventing model obsolescence. By labeling images, the image tuning system 114 can evaluate whether a generated image includes any objects, depictions, or elements requested within the image generation prompt 202, thereby enabling evaluation of the accuracy or aesthetic value of the generated images and further tuning or improvements.

The image tuning system 114 can evaluate the second image 204 (or any other images) by generating indications of the image's accuracy and aesthetic. For example, the image tuning system 114 can generate an accuracy metric 206 and an aesthetic metric 210 using an accuracy determination model and an aesthetic determination model, respectively. An accuracy metric can include an indication of how accurate an image is. For example, the accuracy metric quantifies the extent to which an image includes elements requested within the image generation prompt 204. As an illustrative example, the image generation prompt 202 can compare labels associated with an image (e.g., labels as generated by the image labeling model) with the tokens within the image generation prompt 204. Based on this comparison, the image tuning system 114 can determine a degree of match between the image generation prompt and the labels associated with the image (e.g., a fractional or percentage match). Using this degree of match, the image tuning system 114 can generate the accuracy metric 206. The image tuning system 114 can detect the presence or absence of objects within the image and generate the accuracy metric accordingly. For example, the system generates the accuracy metric based on whether there are additional, unwanted, or unnecessary elements within the generated image. As an illustrative example, an image of a tropical beach with a polar bear elicits a lower accuracy metric due to the inclusion of an animal that is inconsistent with a tropical climate. Additionally or alternatively, the accuracy metric can determine the consistency of the image with externally generated standards or information. For example, the accuracy metric is determined based on whether an element of the image is consistent with information known to the public (e.g., information relating to hats in general, beyond the user's prompt). The second image 204, for example, includes a person and a winter hat; however, the person is not "wearing" the hat according to the conventional, publicly accepted interpretation of the word "wearing" (e.g., the hat appears to be attached to the person's sweater in the second image 204, which is not an accurate depiction of a person wearing a hat). Thus, the accuracy metric can indicate whether a generated image is consistent (e.g., accurate) with the image requested by the user.

Figure 3:
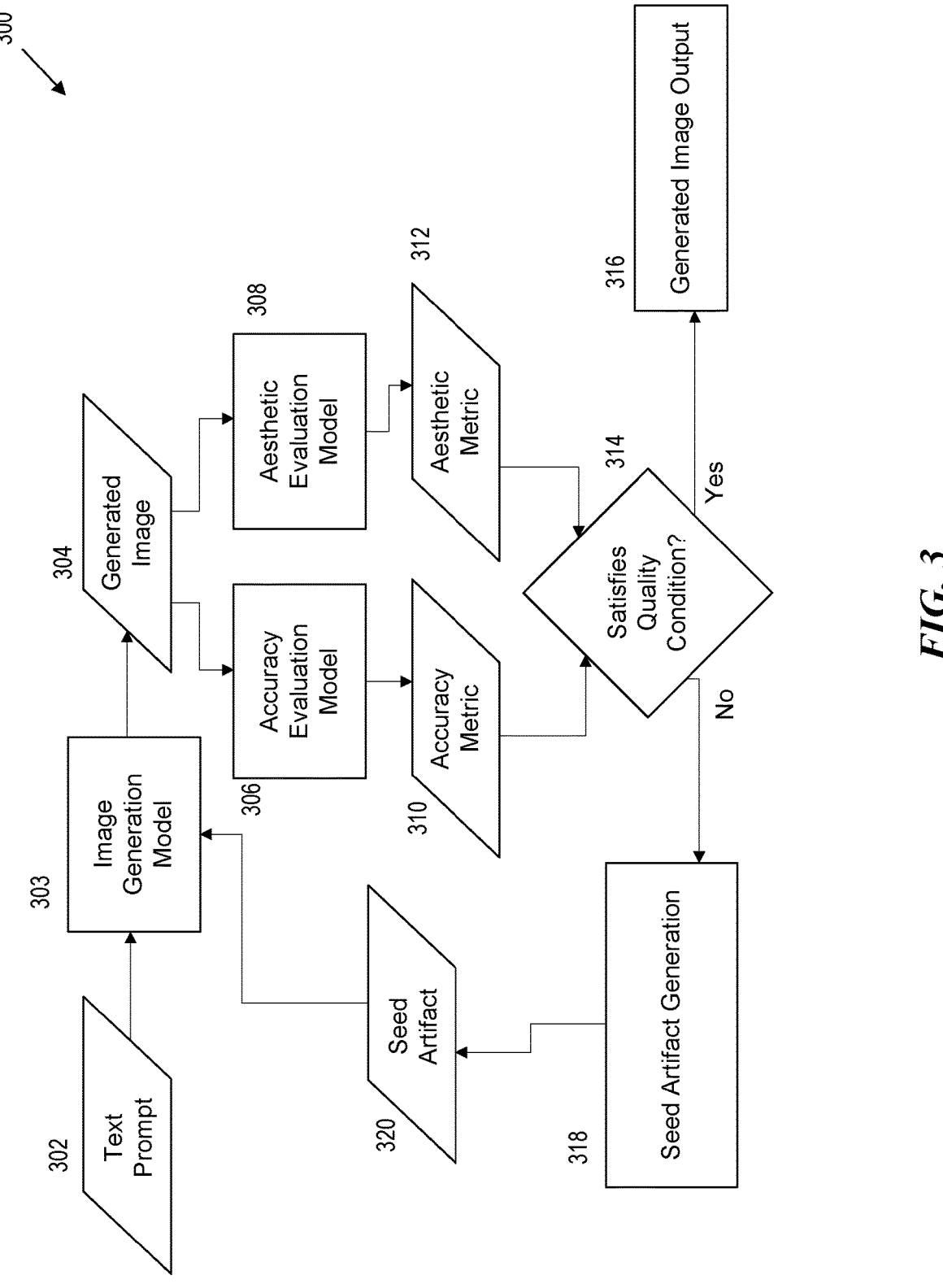
FIG. 3 is a block diagram illustrating a workflow for improving the accuracy and aesthetic quality of images generated from text prompts, in accordance with at least some operations described herein.

In some implementations, the image tuning system includes an aesthetic evaluation model, as described in relation to FIG. 3, which can generate indications of aesthetic properties of a generated image. Such indications of aesthetic properties can also include words, phrases, or tokens that characterize the aesthetic qualities of a given image. By evaluating images for their aesthetic properties and comparing such properties with those aesthetic qualities associated with the requested image (e.g., through the image generation prompt), the image tuning system can evaluate the aesthetic quality and performance of the image generation model, thereby enabling further improvements to the generated images' aesthetic forms. For example, the aesthetic evaluation model can generate an aesthetic metric characterizing the aesthetic value of the generated images based on these indications of aesthetic properties. As an illustrative example, the second image 204 includes a hat, as requested by the image generation prompt 204. However, the hat is a winter hat, which may not be aesthetically considered "fun." Furthermore, the hat is large compared to the person's proportions. In some implementations, the aesthetic metric can capture other features, such as distorted faces or unrealistic object proportions, unpleasant lighting or backgrounds, or other aesthetically relevant features that may not necessarily reflect in the accuracy of the image with respect to the image generation prompt. The aesthetic evaluation model can include other sub-models, such as an aesthetic recognition model, which can generate text-based descriptions of the aesthetic of a given image. For example, an aesthetic recognition model can generate an evaluation of the stylistic elements within a generated image (e.g., by classifying an image as being "noir"-themed). Thus, by generating an aesthetic metric, the image tuning system can capture features of images that are beyond accuracy or inclusion of required elements. By doing so, the system can evaluate images not only for their accuracy but also for their aesthetically pleasing nature, thereby improving the ability of the image tuning system to further improve the image.

The image tuning system 114 can compare the accuracy or aesthetic metrics with respective threshold metrics. For example, the image tuning system 114 can compare the accuracy metric 206 with the threshold accuracy metric 208 or the aesthetic metric 210 with the threshold aesthetic metric 212. If either of these metrics is below the threshold metrics, the image tuning system 114 can determine to regenerate, improve, or tune the image to further improve its accuracy or aesthetics. As an illustrative example, the accuracy metric 206 is below the threshold accuracy metric 208, and the aesthetic metric 210 is below the threshold aesthetic metric 212. As such, the image tuning system 114 can determine to generate a new seed artifact (e.g., a new prompt) to make further improvements to the second image, as described in relation to FIG. 3. In some implementations, the threshold accuracy metric, the threshold aesthetic metric, or other threshold metrics can be set by a user, such as through one or more sliding scales on a graphical user interface. Additionally or alternatively, these threshold metrics can be predetermined and stored within the image tuning system. By doing so, the system can determine to iterate and tune the image further, thereby improving the overall accuracy and aesthetic value of the generated image. Threshold metrics can be derived from a distribution of scores associated with images in training datasets. For instance, the threshold metric can be determined as a score value corresponding to a particular percentile of the distribution of scores, such as a $90^{th}$ percentile score. Additionally or alternatively, the image tuning system 114 determines the threshold metric based on a determination of a use case or a desired outcome, such as based on the prompt, user feedback, A/B testing, or other evaluation or testing methods.

In some implementations, upon determining that the image does not satisfy the accuracy or aesthetic thresholds, the image tuning system 114 can generate a control token based on the determined accuracy or aesthetics of images generated by the image generation model. A control token can include a token (as described above) that aids in further tuning or controlling the properties of subsequent generated images. For example, if the image tuning system 114 determines that the second image 204 exhibits poor accuracy due to the accuracy metric 206, the image tuning system can determine an additional token (e.g., the control token 214) that includes any missing properties for the second image. For example, the image tuning system can determine that wearing a hat includes placing the hat on the person's head. As such, the system can generate the control token 214 to include the phrase or word "on their head" to indicate that the hat should be above the person's head. Additionally or alternatively, the image tuning system 114 generates negative prompts to handle situations where the generated image includes elements that are undesired. For example, the image tuning system 114 generates a token that includes a negative prompt, such as the text string "arctic animals," in order to prevent the subsequent generation of an image of a tropical beach that includes incongruous elements, such as a polar bear. Such negative prompts can include elements to control the image's accuracy, aesthetic quality, or both. The image tuning system 114 can also generate multiple control tokens for an image. The system can determine to cure the aesthetic deficiency of the second image based on the control tokens 216. As an illustrative example, the system can determine that the second image 204 includes a hat that is too large and not fun enough given the image generation prompt 202. By including the words "medium-sized" and "party" within the control tokens 216, the image tuning system 114 can ensure that the image includes a smaller hat than the generated depiction of the hat while including a description to improve the fun aesthetic of the hat as compared to a winter hat.

Thus, by generating control tokens based on the evaluation of the generated second image 204, the image tuning system 114 can generate a modified prompt 218 as a seed artifact for further image generation. As an illustrative example, the image generation model can generate a third image 220 based on the modified prompt 218. The image tuning system 114 can proceed to evaluate the third image 220 for its accuracy (e.g., through the accuracy metric 222) and its aesthetic value (e.g., through the aesthetic metric 226) by comparing these metrics with the respective threshold metrics 224 and 228. In some implementations, the image tuning system 114 can repeat or iterate the process of evaluating the images and generating new prompts or seed artifacts for further image generation. By doing so, the system can further improve both the accuracy and the aesthetic quality of images generated through text-to-image generation systems, thereby improving the quality of results presented to the user in response to input image generation prompts.

FIG. 3 is a block diagram illustrating a workflow 300 for improving the accuracy and aesthetic quality of images generated from text prompts, in accordance with at least some operations described herein. For example, the workflow 300 enables generation of an image output based on evaluating generated images for their accuracy and aesthetic value. By doing so, the image tuning system 114 can improve the quality of images generated from text-based image generation prompts.

For example, the image tuning system 114 can receive a text prompt 302 (e.g., an image generation prompt) generated by a user, which, as described above, can include an indication of text. The image tuning system 114 can input text prompt 302 into an image generation model 303. An image generation model can include a model capable of generating an image based on input data. For example, an image generation model can include text-to-image models or other generative models. As such, the image generation model 303 can include algorithms that include variational autoencoders, flow-based models, generative adversarial networks, and/or diffusion-based models. As such, in some cases, the image generation model can accept a variety of input data types, such as text strings, other images, audio, video, or other seed artifacts. As output, the image generation model 303 can generate images based on the one or more inputs, such as a generated image 304. Thus, the image generation model enables users of the image tuning system 114 to generate images based on various types of information. Furthermore, the image tuning system 114 can improve the inputs to improve or tune the image to be more accurate and aesthetically pleasing.

For example, the image tuning system 114 can further evaluate the generated image 304 using evaluation models, such as an accuracy evaluation model 306 or an aesthetic evaluation model 308. For example, the aesthetic evaluation model 308 can quantitatively evaluate the generated image 304 based on a variety of aesthetic-related factors, such as depth of field, lighting, position, focus, contrast, color, and brightness of the image. For example, these factors may not influence the accuracy of the image. However, because such factors can influence the subjective, aesthetic quality of the image, the image tuning system 114 can generate a quantitative measure (e.g., the aesthetic metric 312 or 210, as described above) evaluating such factors. The aesthetic evaluation model 308 can include any machine learning models or algorithms, such as artificial neural networks or regression techniques, including supervised or unsupervised learning methods. For example, the aesthetic evaluation model 308 can accept training data of images (e.g., original or altered) and corresponding aesthetic descriptors or tokens. By utilizing an aesthetic evaluation model, the image tuning system 114 can improve the quality of evaluations of the aesthetics of the generated image 304, enabling further tuning or improvements if unsatisfactory.

Furthermore, the image tuning system 114 can quantitatively evaluate the generated image 304 for its accuracy using the accuracy evaluation model 306. For example, the image tuning system 114 can generate accuracy metrics 310 or 206, as discussed in relation to FIG. 2. In addition to the image labeling model discussed in relation to FIG. 2, the image tuning system 114 can quantify the accuracy of the generated image 304 based on generating a probability value indicating whether the generated image 304 includes one or more tokens from the text prompt 302. For example, the accuracy evaluation model 306 can utilize an image recognition model to generate probability values that the generated image 304 includes one or more objects or elements from the text prompt 302. The image recognition model and/or the accuracy evaluation model 306 can include supervised or unsupervised machine learning algorithms, such as deep convolutional networks, image classification models, and/or inference models. By including an accuracy evaluation model 306, the image tuning system 114 can evaluate the extent to which the generated image 304 corresponds to the text prompt 302, thereby providing a quantitative indication of the quality of the image.

The image tuning system 114 can determine whether the generated image 304 satisfies conditions for image quality at the decision point 314. In some implementations, the image tuning system 114 can compare the accuracy metric 310 and the aesthetic metric 312 with respective threshold metrics in order to determine whether the generated image 304 is of satisfactory quality for transmission back to the user. For example, if the accuracy metric 310 and the aesthetic metric 312 are both less than (or, in some implementations, equal to) the respective threshold metrics, the image tuning system 114 may determine that the quality condition is not satisfied. Alternatively or additionally, if either of the accuracy metric 310 or the aesthetic metric 312 is not greater than (or, in some implementations, equal to) the respective threshold metric, the image tuning system 114 may determine that the quality condition is not satisfied. The image tuning system 114 can generate other metrics based on the accuracy metric 310 and the aesthetic metric 312.

For example, the image tuning system 114 can generate a quality metric that is calculated using the accuracy metric 310 and the aesthetic metric 312. As an illustrative example, the quality metric includes an average of the accuracy metric 310 and the aesthetic metric 312. In some implementations, the quality metric is a weighted average of the accuracy metric 310 and the aesthetic metric 312. For example, a user can provide, through a sliding scale on a user interface, an indication of the respective weights for the weighted average for the accuracy metric 310 or the aesthetic metric 312. The image tuning system 114 system can then compare the generated quality metric with a threshold metric in order to determine whether the generated image 304 satisfies the conditions for image quality. Thus, by combining the accuracy information and the aesthetic information into a single value, the system improves the flexibility of users to tune the image to their preference.

If the image tuning system 114 determines that the generated image 304 satisfies the aforementioned aesthetic and accuracy conditions, the image tuning system in 114 can transmit the generated image as output to a user (e.g., at process 316). Alternatively, if the generated image 304 is determined not to satisfy the aesthetic and accuracy conditions, the image tuning system 114 can generate a seed artifact 320 (e.g., at process 318) for further input into the image generation model 303. A seed artifact can include any token, value, or data that can be input into the image generation model for generation of the image. In some implementations, the seed artifact can modify existing inputs (e.g., the text prompt 302 or the image generation prompt 202). The seed artifact 320 can include the control tokens 214 or 216 or can include the modified prompt 218. The seed artifact 320 can include data with a variety of data formats. For example, the seed artifact 320 can include a vector representation of the generated image 304, such that the image generation model 303 can iteratively make improvements on generated images without starting from scratch. As such, the image tuning system 114 improves the effectiveness and efficiency of the image generation model

303 by enabling iterative improvements to inputs on the basis of an evaluation of generated images' accuracy and aesthetic qualities.

Figure 4:
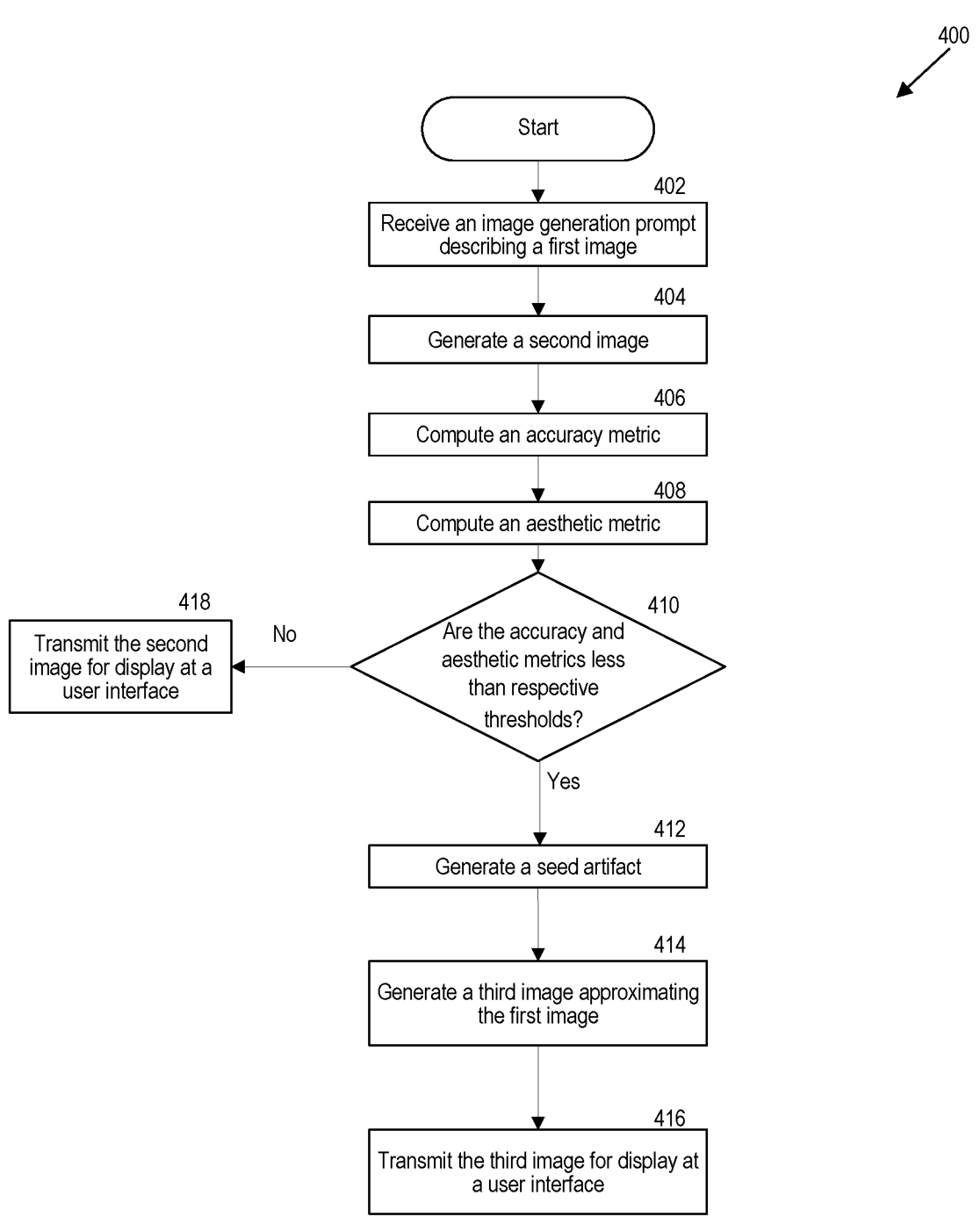
FIG. 4 is a flowchart illustrating a process for iteratively generating images based on aesthetic and accuracy metrics, in accordance with at least some operations described herein.

FIG. 4 is a flowchart 400 illustrating a process for iteratively generating images based on aesthetic and accuracy metrics, in accordance with at least some operations described herein. For example, the image tuning system 114 enables improvements in artificial intelligence-generated images based on text prompts by iterating based on the accuracy and aesthetics of generated images.

At act 402, the image tuning system 114 can receive an image generation prompt for a requested image from a user. For example, the image tuning system receives, from a user device, an image generation prompt, wherein the image generation prompt comprises a text string describing a first image. As an illustrative example, the system can receive a request for a particular image from a user of the electronic device 110, where the request includes a text string describing elements of the image that the user desires. Thus, by receiving such a prompt, the image tuning system 114 receives information based on which further evaluation and tuning may be performed.

At act 404, the image tuning system 114 can generate a second image using an image generation model. For example, the image tuning system 114 generates a second image approximating the first image by applying an image generation model to the image generation prompt. As an illustrative example, the system can input the text string corresponding to the image generation prompt into an image generation model (e.g., a text-to-image generator) in order to generate a digital image that includes the elements requested by the user based on the image generation prompt. By doing so, the image tuning system 114 may generate an approximation for the user's requested image, enabling further evaluation, tuning, and transmission back to the user according to accuracy and aesthetic standards.

At act 406, the image tuning system 114 can compute an accuracy metric based on the second image. For example, the image tuning system 114 can compute, for the second image, an accuracy metric, wherein the accuracy metric indicates a degree of correspondence between the first image and the second image. As an illustrative example, the image tuning system can identify elements in the generated image (e.g., the second image) and determine the extent to which the image requested by the user (e.g., as described by the image generation prompt) is commensurate with the generated image. By doing so, the image tuning system 114 may ensure that the generated image is consistent with the user's request, thereby enabling evaluation and subsequent improvement of image generation tasks.

In some implementations, the image tuning system 114 can compute the accuracy metric based on determining a probability of whether the second image includes any requested elements. For example, computing, for the second image, the accuracy metric can include determining a token within the image generation prompt, wherein the token comprises a set of alphanumeric characters representing an object in the first image. The image tuning system 114 can compute a probability that the second image includes a depiction of the object associated with the token by applying an image recognition model to the second image. Thus, the image tuning system can compute the accuracy metric based on the probability. As an illustrative example, the user's image generation prompt may include a requested element in the first image corresponding to a dog. The image tuning system 114 can generate a probability that the generated second image includes a dog based on an image recognition model as described above. As such, the image tuning system 114 may quantitatively measure the correspondence of the generated second image with the requested first image, thereby providing a way in which to quantify the accuracy of the generated image.

In some implementations, the image tuning system 114 can compute the accuracy metric based on generating labels associated with the generated second image with information from the image generation prompt. For example, computing, for the second image, the accuracy metric can include generating a label for the second image by applying an image labeling model to the second image, wherein the label comprises an alphanumeric string indicating a description of the second image. The image tuning system 114 can compute the accuracy metric based on comparing the label for the second image with the image generation prompt. As an illustrative example, the image tuning system 114 can determine a list of elements (e.g., tokens) associated with the image generation prompt that indicates desired elements in the first image. For example, the image generation prompt 202 includes elements such as "person," "wearing," and "hat." The image tuning system 114, such as through the accuracy evaluation model 306, can utilize an image labeling model to determine a set of labels associated with the second image, such as "person" and "hat." By determining the percentage or fraction of elements from the image generation prompt 202 that are also reflected in the labels for the second image, the image tuning system 114 may generate an accuracy metric indicative of the degree of correspondence between the requested first image and the generated second image. In some implementations, the image tuning system 114 can combine this label-based accuracy metric with the probability-based accuracy metric described above to generate a composite accuracy metric, thereby improving the data and accuracy with which the accuracy metric is determined.

At act 408, the image tuning system 114 can compute an aesthetic metric based on the second image. For example, the image tuning system 114 can compute, for the second image, an aesthetic metric, wherein the aesthetic metric indicates a degree of aesthetic value for the second image. As an illustrative example, the image tuning system 114 can determine the degree to which a generated image (e.g., the second image) may be aesthetically pleasing, beautiful, or not unsettling. The image tuning system 114 can, for example, utilize an aesthetic evaluation model to quantify the degree of aesthetic value associated with an image based on a variety of factors. By doing so, the image tuning system 114 can fine-tune generated images such that they are pleasing to look at and of higher quality, thereby improving the performance and quality of image generation tasks.

For example, in some implementations, the image tuning system 114 can compute the aesthetic metric based on a variety of factors within the generated image. For example, computing, for the second image, the aesthetic metric can include generating the aesthetic metric based on applying an aesthetic evaluation model to the second image, wherein the aesthetic evaluation model is trained to output aesthetic metrics based on at least one of depth of field, lighting, position, focus, contrast, color, and brightness. As an illustrative example, the aesthetic evaluation model can determine aesthetic attributes, such as those listed previously, associated with the image and compare these with attributes that are considered to be aesthetically pleasing (e.g., through training data). By doing so, the aesthetic evaluation model can determine a quantification of the second image's aesthetic value, thereby providing information to the image tuning system to determine whether to make any further modifications or improvements to the generated image. In some cases, the aesthetic evaluation model may also consider other attributes, such as style or theme. For example, a user request for a "noir"-themed image may evoke or benefit from different lighting, color, hue, or brightness than a "colorful" image. Thus, the image tuning system enables flexibility and tailoring of generated images to both the elements within the prompts as well as the aesthetic attributes attached to or intrinsic to such elements.

In some implementations, the image tuning system 114 can compute the aesthetic metric based on evaluating whether the generated second image includes descriptive tokens from the image generation prompt. For example, computing, for the second image, the aesthetic metric can include extracting descriptive tokens from the image generation prompt, where the descriptive tokens indicate aesthetic qualities of the first image. The image tuning system 114 can generate indicators of the one or more aesthetic properties for the second image by applying an aesthetic recognition model to the second image. The aesthetic recognition model can be trained to output text describing aesthetic properties for input images. The image tuning system can compute the aesthetic metric based on comparing one or more of the descriptive tokens with the indicators of the one or more aesthetic properties. For example, the image tuning system 114 can determine that a generated image corresponds to a "noir" theme, while the image generation prompt may specify a "fun" emotion. As such, the aesthetic evaluation model can determine that the generated image has a poor aesthetic score and, as such, can provide information that is useful to the image tuning system for further tuning and generation of images with improved aesthetic value. As with the accuracy metric discussed above, various evaluation methods can be combined to determine a composite aesthetic metric for a given image.

At act 410, the image tuning system 114 can compare the accuracy and aesthetic metrics with corresponding threshold metrics. The image tuning system can execute further tasks based on the results of these comparisons, such as transmitting the second image for display at a user interface at act 418. In some cases, such as when the computed accuracy metric is less than or equal to a threshold accuracy metric, or the computed aesthetic metric is less than or equal to a threshold aesthetic metric, the image tuning system can generate a seed artifact (e.g., at act 412) indicative of a next action to be performed in response to receiving the image generation prompt. For example, as shown in FIG. 2, based on determining that the accuracy and aesthetic metrics are not sufficiently high to satisfy the respective thresholds, the image tuning system can generate a new image generation prompt (e.g., modified prompt 218) for further tuning and improvements. By generating a seed artifact, the image tuning system 114 enables further improvements to the generated images based on modifications to the image generation model's input.

In some implementations, the image tuning system 114 generates the seed metric based on a quality metric, which is computed based on the accuracy metric and the aesthetic metric. For example, the image tuning system 114 can compute a quality metric for the second image based on the accuracy metric and the aesthetic metric. When the quality metric is less than a threshold metric (e.g., a threshold quality metric), the image tuning system 114 can generate the seed artifact accordingly. By generating a composite metric comprising, for example, both the accuracy metric and the aesthetic metric, the image tuning system 114 can consider both the aesthetic features and the accuracy of the image in a holistic manner, thereby improving the flexibility and sensitivity of image generation. For example, users can determine weights associated with the aesthetic metric and the accuracy metric, respectively, and generate the quality metric based on these weights, thereby providing the user enhanced control over the quality of generated images.

In some implementations, the image tuning system 114 generates the seed metric based on control tokens indicating features or elements of the second image determined to be missing or deficient. For example, the image tuning system 114 can generate control tokens based on the computed accuracy metric or the computed aesthetic metric, where the control token indicates a property of the first image missing in the second image. The image tuning system 114 can update the image generation prompt to include the control token and can store the updated input generation prompt as the generated seed artifact. For example, the accuracy metric may reflect that the generated second image is missing a dog, despite the image generation prompt specifying the inclusion of a dog. In response, the image tuning system 114 can generate a control token including a text string of the word "dog," which can then be appended to the input generation prompt (e.g., concatenated), which can correspond to the seed artifact. By doing so, the image tuning system 114 enables iterative improvements to images based on computed accuracy or aesthetic qualities that may be deficient in the generated images.

In some implementations, the image tuning system 114 can generate seed artifacts based on vector representations of the second image. For example, the image tuning system can generate the seed artifact based on the second image, where the generated seed artifact comprises a vector representation of the second image. As an illustrative example, the image tuning system 114 can generate a representation of the second image and include this seed artifact as further input into the image generation model to improve iteratively the accuracy and/or aesthetics of the generated image. Alternatively or additionally, the image tuning system can include, as input into the image generation model, a control token itself (as described above) as well as the vector representation of the generated second image, thereby enabling the image generation model to iteratively improve the generated image with the contents of the control token without starting from scratch, thereby improving the accuracy and efficiency of image generation tasks simultaneously.

At act 414, based on the seed artifact, the image tuning system can generate a third image approximating the first image. For example, based on the generated seed artifact, the image tuning system can generate a third image approximating the first image by applying the image generation model to a modified image generation prompt or the generated second image. The image generation prompt, in some implementations, can receive as input a modified image generation prompt that includes information or features (e.g., aesthetic or missing elements) to improve the generated image. In some implementations, the image generation model can accept as input the second generated image and output the third image based on iterative modifications to the second generated image. By doing so, the image tuning system can improve the quality of images generated by, for example, text-to-image generators.

At act 416, the image tuning system 114 can transmit the third image for display at a user interface. For example, the image tuning system can transmit the generated third image to the user device to enable display of the generated third image at a user interface of the user device. For example, the image tuning system 114 can provide the requesting user a result based on the received image generation prompt, with improvements based on an evaluation of the accuracy and aesthetic quality of the generated image. By doing so, image tuning system 114 enables users to receive improved, more aesthetically pleasing images from image generation models. In some implementations, the image tuning system can further iterate and improve on the image through further evaluation of the accuracy or aesthetic metrics and further generation of seed artifacts and corresponding images. Thus, the image tuning system, in some implementations, transmits the generated image only when any or all thresholds are satisfied, thereby ensuring the accuracy or aesthetic value of the generated image prior to transmission to the requesting user.

Computer System

Figure 5:
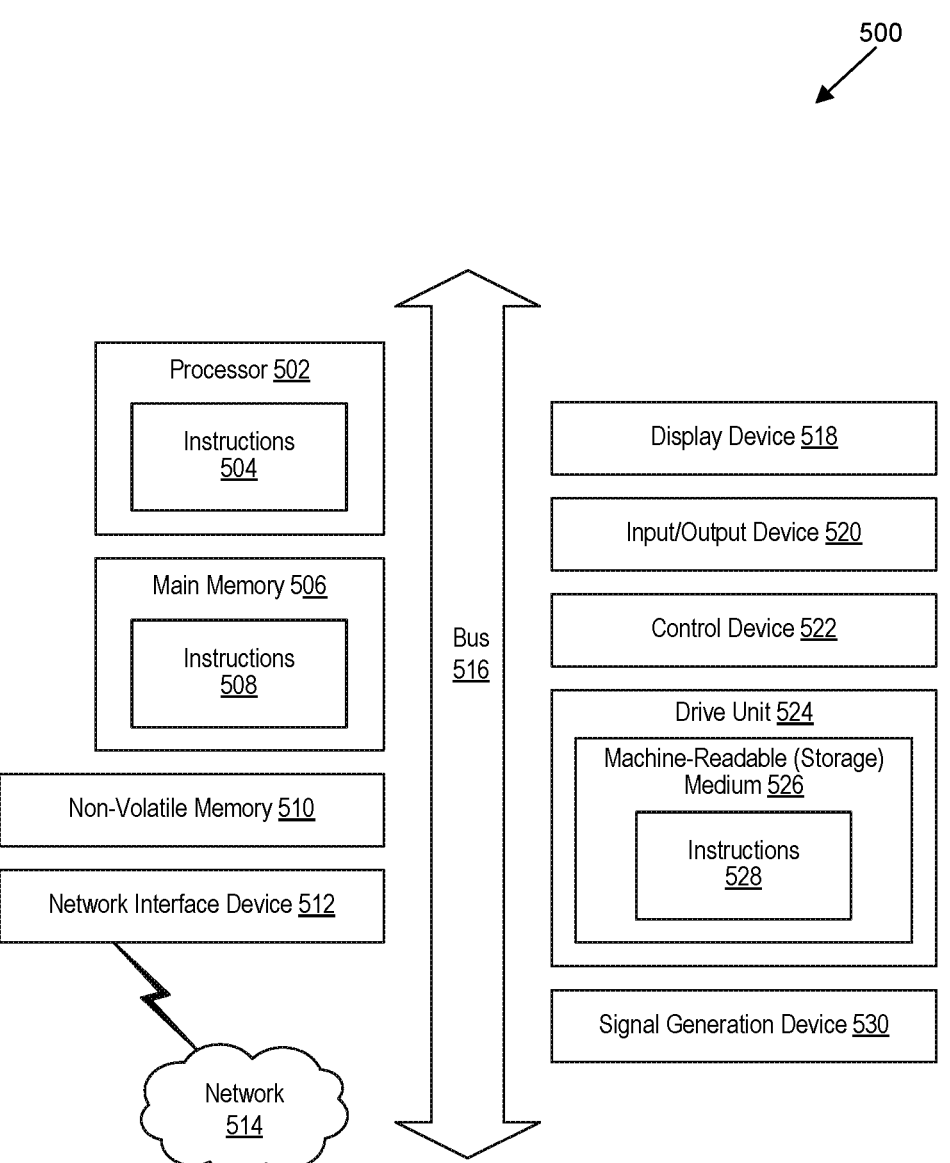
FIG. 5 is a block diagram that illustrates components of a computing device in which at least some operations described herein can be executed.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Wireless Communications System

FIG. 6 is a block diagram that illustrates a wireless telecommunications network 600 ("network 600") in which aspects of the disclosed technology are incorporated. The network 600 includes base stations 602-1 through 602-4 (also referred to individually as "base station 602" or collectively as "base stations 602"). A base station is a type of network access node (NAN) that can also be referred to as a cell site, a base transceiver station, or a radio base station.

The NANs of a network 600 formed by the network 600 also include wireless devices 604-1 through 604-7 (referred to individually as "wireless device 604" or collectively as "wireless devices 604") and a core network 606. The wireless devices 604 can correspond to or include network 600 entities capable of communication using various connectivity standards. For example, a 5G communication channel can use millimeter wave (mmW) access frequencies of 28 GHz or more. In some implementations, the wireless device 604 can operatively couple to a base station 602 over a long-term evolution/long-term evolution-advanced (LTE/LTE-A) communication channel, which is referred to as a 4G communication channel.

The core network 606 provides, manages, and controls security services, user authentication, access authorization, tracking, internet protocol (IP) connectivity, and other access, routing, or mobility functions. The base stations 602 interface with the core network 606 through a first set of backhaul links (e.g., S1 interfaces) and can perform radio configuration and scheduling for communication with the wireless devices 604 or can operate under the control of a base station controller (not shown). In some examples, the base stations 602 can communicate with each other, either directly or indirectly (e.g., through the core network 606), over a second set of backhaul links 610-1 through 610-3 (e.g., X1 interfaces), which can be wired or wireless communication links.

The base stations 602 can wirelessly communicate with the wireless devices 604 via one or more base station antennas. The cell sites can provide communication coverage for geographic coverage areas 612-1 through 612-4 (also referred to individually as "coverage area 612" or collectively as "coverage areas 612"). The geographic coverage area 612 for a base station 602 can be divided into sectors making up only a portion of the coverage area (not shown). The network 600 can include base stations of different types (e.g., macro and/or small cell base stations). In some implementations, there can be overlapping geographic coverage areas 612 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 600 can include a 5G network 600 and/or an LTE/LTE-A or other network. In an LTE/LTE-A network, the term "eNBs" is used to describe the base stations 602, and in 5G new radio (NR) networks, the term "gNBs" is used to describe the base stations 602 that can include mmW communications. The network 600 can thus form a heterogeneous network 600 in which different types of base stations provide coverage for various geographic regions. For example, each base station 602 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 600 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 600 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 600 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 604 and the base stations 602 or core network 606 supporting radio bearers for the user plane data. At the Physical (PHY) layer, the transport channels are mapped to physical channels.

Wireless devices can be integrated with or embedded in other devices. As illustrated, the wireless devices 604 are distributed throughout the network 600, where each wireless device 604 can be stationary or mobile. For example, wireless devices can include handheld mobile devices 604-1 and 604-2 (e.g., smartphones, portable hotspots, tablets, etc.); laptops 604-3; wearables 604-4; drones 604-5; vehicles with wireless connectivity 604-6; head-mounted displays with wireless augmented reality/virtual reality (AR/VR) connectivity 604-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 604) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 600 equipment at the edge of a network 600 including macro eNBs/gNBs, small cell eNBs/gNBs, relay base stations, and the like. A wireless device can also communicate with other wireless devices either within or outside the same coverage area of a base station via device-to-device (D2D) communications.

The communication links 614-1 through 614-9 (also referred to individually as "communication link 614" or collectively as "communication links 614") shown in network 600 include uplink (UL) transmissions from a wireless device 604 to a base station 602 and/or downlink (DL) transmissions from a base station 602 to a wireless device 604. The downlink transmissions can also be called forward link transmissions while the uplink transmissions can also be called reverse link transmissions. Each communication link 614 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 614 can transmit bidirectional communications using frequency division duplex (FDD) (e.g., using paired spectrum resources) or time division duplex (TDD) operation (e.g., using unpaired spectrum resources). In some implementations, the communication links 614 include LTE and/or mmW communication links.

In some implementations of the network 600, the base stations 602 and/or the wireless devices 604 include multiple antennas for employing antenna diversity schemes to improve communication quality and reliability between base stations 602 and wireless devices 604. Additionally or alternatively, the base stations 602 and/or the wireless devices 604 can employ multiple-input, multiple-output (MIMO) techniques that can take advantage of multi-path environments to transmit multiple spatial layers carrying the same or different coded data.

In some examples, the network 600 implements 6G technologies including increased densification or diversification of network nodes. The network 600 can enable terrestrial and non-terrestrial transmissions. In this context, a Non-Terrestrial Network (NTN) is enabled by one or more satellites, such as satellites 616-1 and 616-2, to deliver services anywhere and anytime and provide coverage in areas that are unreachable by any conventional Terrestrial Network (TN). A 6G implementation of the network 600 can support terahertz (THz) communications. This can support wireless applications that demand ultrahigh quality of service (QoS) requirements and multi-terabits-per-second data transmission in the 6G and beyond era, such as terabit-per-second backhaul systems, ultra-high-definition content streaming among mobile devices, AR/VR, and wireless high-bandwidth secure communications. In another example of 6G, the network 600 can implement a converged Radio Access Network (RAN) and Core architecture to achieve Control and User Plane Separation (CUPS) and achieve extremely low user plane latency. In yet another example of 6G, the network 600 can implement a converged Wi-Fi and Core architecture to increase and improve indoor coverage.

5G Core Network Functions

Figure 7:
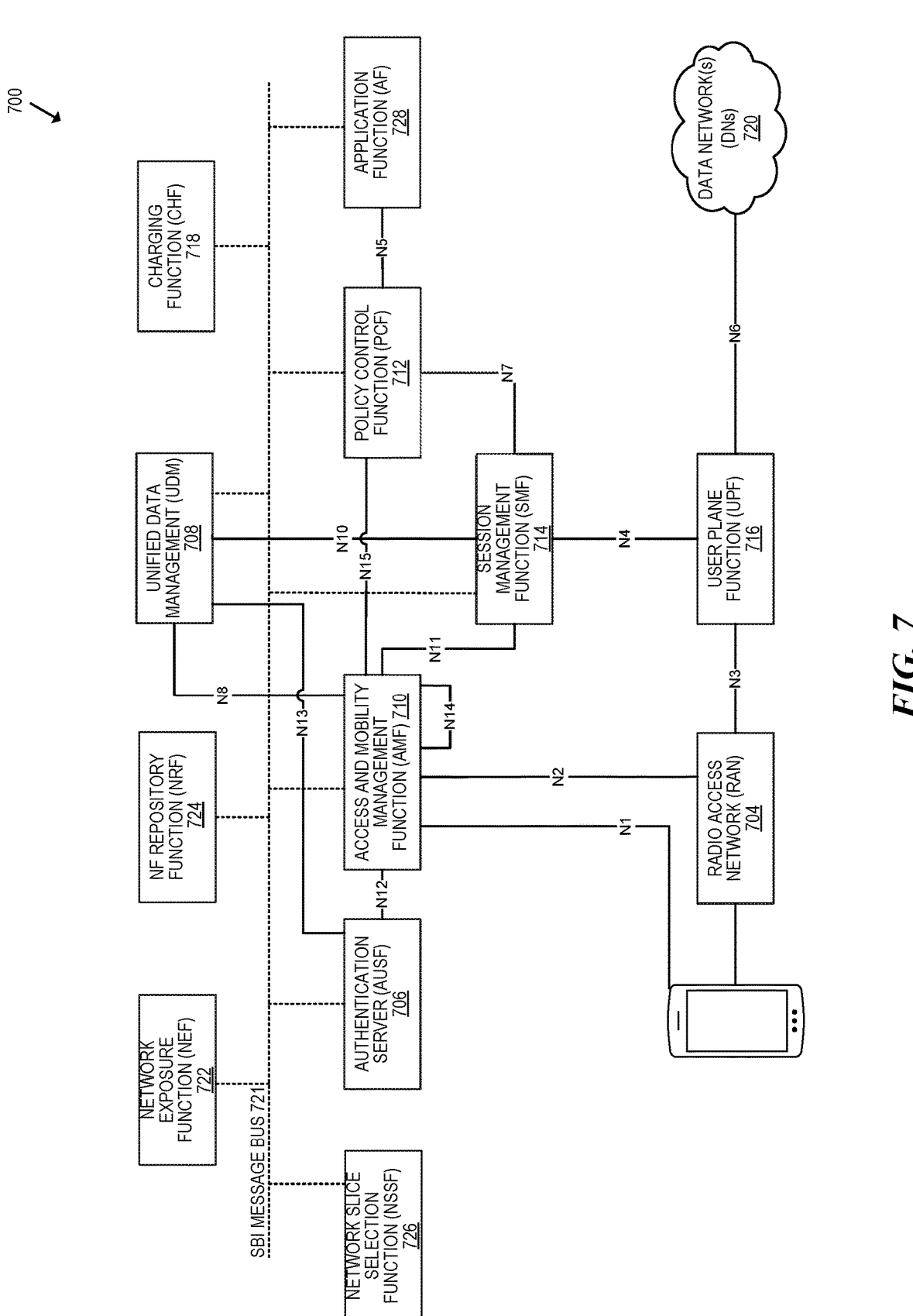
FIG. 7 is a block diagram that illustrates 5G core network functions (NFs) that can implement aspects of the present technology.

FIG. 7 is a block diagram that illustrates an architecture 700 including 5G core network functions (NFs) that can implement aspects of the present technology. A wireless device 702 can access the 5G network through a NAN (e.g., gNB) of a RAN 704. The NFs include an Authentication Server Function (AUSF) 706, a Unified Data Management (UDM) 708, an Access and Mobility management Function (AMF) 710, a Policy Control Function (PCF) 712, a Session Management Function (SMF) 714, a User Plane Function (UPF) 716, and a Charging Function (CHF) 718.

The interfaces N1 through N15 define communications and/or protocols between each NF as described in relevant standards. The UPF 716 is part of the user plane and the AMF 710, SMF 714, PCF 712, AUSF 706, and UDM 708 are part of the control plane. One or more UPFs can connect with one or more data networks (DNs) 720. The UPF 716 can be deployed separately from control plane functions. The NFs of the control plane are modularized such that they can be scaled independently. As shown, each NF service exposes its functionality in a Service Based Architecture (SBA) through a Service Based Interface (SBI) 721 that uses HTTP/2. The SBA can include a Network Exposure Function (NEF) 722, an NF Repository Function (NRF) 724, a Network Slice Selection Function (NSSF) 726, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 724, which maintains a record of available NF instances and supported services. The NRF 724 allows other NF instances to subscribe and be notified of registrations from NF instances of a given type. The NRF 724 supports service discovery by receipt of discovery requests from NF instances and, in response, details which NF instances support specific services.

The NSSF 726 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 702 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 708 and then requests an appropriate network slice of the NSSF 726.

The UDM 708 introduces a User Data Convergence (UDC) that separates a User Data Repository (UDR) for storing and managing subscriber information. As such, the UDM 708 can employ the UDC under 3GPP TS 22.101 to support a layered architecture that separates user data from application logic. The UDM 708 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 708 can contain voluminous amounts of data that is accessed for authentication. Thus, the UDM 708 is analogous to a Home Subscriber Server (HSS) and can provide authentication credentials while being employed by the AMF 710 and SMF 714 to retrieve subscriber data and context.

The PCF 712 can connect with one or more Application Functions (AFs) 728. The PCF 712 supports a unified policy framework within the 5G infrastructure for governing network behavior. The PCF 712 accesses the subscription information required to make policy decisions from the UDM 708 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 724. This allows the SCP to become the delegated discovery point in a datacenter, offloading the NRF 724 from distributed service meshes that make up a network operator's infrastructure. Together with the NRF 724, the SCP forms the hierarchical 5G service mesh.

The AMF 710 receives requests and handles connection and mobility management while forwarding session management requirements over the N11 interface to the SMF 714. The AMF 710 determines that the SMF 714 is best suited to handle the connection request by querying the NRF 724. That interface and the N11 interface between the AMF 710 and the SMF 714 assigned by the NRF 724 use the SBI 721. During session establishment or modification, the SMF 714 also interacts with the PCF 712 over the N7 interface and the subscriber profile information stored within the UDM 708. Employing the SBI 721, the PCF 712 provides the foundation of the policy framework that, along with the more typical QoS and charging rules, includes network slice selection, which is regulated by the NSSF 726.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory, computer-readable storage medium storing instructions, which, when executed by at least one data processor of a system, cause the system to:

receive, from a first user device, a first image generation prompt comprising a first text string describing a target image;

receive, from a second user device, a second image generation prompt comprising a second text string describing the target image;

determine a first subscription status associated with a first user of the first user device;

using the determined first subscription status, compute a first weight for the first image generation prompt;

determine a second subscription status associated with the second user device;

using the determined second subscription status, compute a second weight for the second image generation prompt;

in response to the first weight for the first image generation prompt being greater than or equal to the second weight for the second image generation prompt, generate a second image approximating the target image by applying an image generation model to the first image generation prompt in lieu of applying the image generation model to the second image generation prompt;

in response to the second weight for the second image generation prompt being greater than the first weight for the first image generation prompt, generate a second image approximating the target image by applying an image generation model to the second image generation prompt in lieu of applying the image generation model to the first image generation prompt;

compute, for the second image, an accuracy metric, wherein the accuracy metric indicates a degree of correspondence between the target image and the second image;

compute, for the second image, an aesthetic metric, wherein the aesthetic metric indicates a degree of aesthetic value for the second image; and when: (1) the computed accuracy metric is less than or equal to a threshold accuracy metric, or (2) the computed aesthetic metric is less than or equal to a threshold aesthetic metric:

generate a seed artifact indicative of a next action to be performed in response to receiving the first image generation prompt;

based on the generated seed artifact, generate a third image approximating the target image by applying the image generation model to the generated second image; and transmit the generated third image to the first user device to enable display of the generated third image at a user interface of the first user device.

2. The at least one non-transitory, computer-readable storage medium of claim 1, wherein the instructions for computing, for the second image, the accuracy metric cause the system to:

determine a token within the first image generation prompt, wherein the token comprises a set of alphanumeric characters representing an object in the target image;

compute a probability that the second image includes a depiction of the object associated with the token by applying an image recognition model to the second image; and compute the accuracy metric based on the probability.

3. The at least one non-transitory, computer-readable storage medium of claim 1, wherein the instructions for computing, for the second image, the accuracy metric cause the system to:

generate a label for the second image by applying an image labeling model to the second image, wherein the label comprises an alphanumeric string indicating a description of the second image; and compute the accuracy metric based on comparing the label for the second image with the first image generation prompt.

4. The at least one non-transitory, computer-readable storage medium of claim 1, wherein the instructions for computing, for the second image, the aesthetic metric cause the system to generate the aesthetic metric based on applying an aesthetic evaluation model to the second image, wherein the aesthetic evaluation model is trained to output aesthetic metrics based on at least one of: depth of field, lighting, position, focus, contrast, color, and brightness.

5. The at least one non-transitory, computer-readable storage medium of claim 1, wherein the instructions for computing, for the second image, the aesthetic metric cause the system to:

extract descriptive tokens from the first image generation prompt, wherein the descriptive tokens indicate aesthetic qualities of the target image;

generate indicators of one or more aesthetic properties for the second image by applying an aesthetic recognition model to the second image, wherein the aesthetic recognition model is trained to output text describing aesthetic properties for input images; and compute the aesthetic metric based on comparing one or more of the descriptive tokens with the indicators of the one or more aesthetic properties.

6. The at least one non-transitory, computer-readable storage medium of claim 1, wherein the instructions cause the system to:

compute a quality metric based on the computed accuracy metric and the computed aesthetic metric; and generate the seed artifact based on determining that the quality metric is less than a threshold quality metric.

7. The at least one non-transitory, computer-readable storage medium of claim 1, wherein the instructions for generating the seed artifact cause the system to:

generate a control token based on the computed accuracy metric or the computed aesthetic metric, wherein the control token indicates a property of the target image missing in the second image;

update the first image generation prompt to include the control token; and store the updated first image generation prompt as the generated seed artifact.

8. The at least one non-transitory, computer-readable storage medium of claim 1, wherein the instructions for generating the seed artifact cause the system to generate the seed artifact based on the second image, wherein the generated seed artifact comprises a vector representation of the second image.

9. A system comprising:

at least one hardware processor; and at least one non-transitory memory storing instructions, which, when executed by the at least one hardware processor, cause the system to:

receive, from a first user device, a first image generation prompt comprising a first text string describing a target image;

receive, from a second user device, a second image generation prompt comprising a second text string describing the target image;

determine a first subscription status associated with a first user of the first user device;

using the determined first subscription status, compute a first weight for the first image generation prompt;

determine a second subscription status associated with a second user of the second user device;

using the determined second subscription status, compute a second weight for the second image generation prompt;

in response to the first weight for the first image generation prompt being greater than or equal to the second weight for the second image generation prompt, generate a second image approximating the target image by applying an image generation model to the first image generation prompt in lieu of applying the image generation model to the second image generation prompt;

in response to the second weight for the second image generation prompt being greater than the first weight for the first image generation prompt, generate a second image approximating the target image by applying an image generation model to the second image generation prompt in lieu of applying the image generation model to the first image generation prompt;

compute, for the second image, an accuracy metric, wherein the accuracy metric indicates a degree of correspondence between the target image and the second image;

compute, for the second image, an aesthetic metric, wherein the aesthetic metric indicates a degree of aesthetic value for the second image;

compute a quality metric for the second image based on the accuracy metric and the aesthetic metric; and when the quality metric is less than a threshold metric:

generate a seed artifact indicative of a next action to be performed in response to receiving the first image generation prompt;

based on the generated seed artifact, generate a third image approximating the target image by applying the image generation model to the generated second image; and transmit the generated third image to the first user device to enable display of the generated third image at a user interface of the first user device.

10. The system of claim 9, wherein the instructions for computing, for the second image, the accuracy metric cause the system to:

determine a token within the first image generation prompt, wherein the token comprises a set of alphanumeric characters representing an object in the target image;

compute a probability that the second image includes a depiction of the object associated with the token by applying an image recognition model to the second image; and compute the accuracy metric based on the probability.

11. The system of claim 9, wherein the instructions for computing, for the second image, the accuracy metric cause the system to:

generate a label for the second image by applying an image labeling model to the second image, wherein the label comprises an alphanumeric string indicating a description of the second image; and compute the accuracy metric based on comparing the label for the second image with the first image generation prompt.

12. The system of claim 9, wherein the instructions for computing, for the second image, the aesthetic metric cause the system to generate the aesthetic metric based on applying an aesthetic evaluation model to the second image, wherein the aesthetic evaluation model is trained to output aesthetic metrics based on at least one of: depth of field, lighting, position, focus, contrast, color, and brightness.

13. The system of claim 9, wherein the instructions for computing, for the second image, the aesthetic metric cause the system to:

extract descriptive tokens from the first image generation prompt, wherein the descriptive tokens indicate aesthetic qualities of the target image;

generate indicators of one or more aesthetic properties for the second image by applying an aesthetic recognition model to the second image, wherein the aesthetic recognition model is trained to output text describing aesthetic properties for input images; and compute the aesthetic metric based on comparing one or more of the descriptive tokens with the indicators of the one or more aesthetic properties.

14. The system of claim 9, wherein the instructions for generating the seed artifact cause the system to:

generate a control token based on the computed accuracy metric or the computed aesthetic metric, wherein the control token indicates a property of the target image missing in the second image;

update the first image generation prompt to include the control token; and store the updated first image generation prompt as the generated seed artifact.

15. The system of claim 9, wherein the instructions for generating the seed artifact cause the system to generate the seed artifact based on the second image, wherein the generated seed artifact comprises a vector representation of the second image.

16. A method comprising:

receiving, from a first user device, a first image generation prompt comprising a first text string describing a target image;

receiving, from a second user device, a second image generation prompt comprising a second text string describing the target image;

determining a first subscription status associated with a first user of the first user device;

using the determined first subscription status, computing a first weight for the first image generation prompt;

determining a second subscription status associated with a second user of the second user device;

using the determined second subscription status, computing a second weight for the second image generation prompt;

in response to the first weight for the first image generation prompt being greater than or equal to the second weight for the second image generation prompt, generating a second image approximating the target image by applying an image generation model to the first image generation prompt in lieu of applying the image generation model to the second image generation prompt;

in response to the second weight for the second image generation prompt being greater than the first weight for the first image generation prompt, generating a second image approximating the target image by applying an image generation model to the second image generation prompt in lieu of applying the image generation model to the first image generation prompt;

computing, for the second image, an accuracy metric, wherein the accuracy metric indicates a degree of correspondence between the target image and the second image;

computing, for the second image, an aesthetic metric, wherein the aesthetic metric indicates a degree of aesthetic value for the second image; and when: (1) the computed accuracy metric is less than or equal to a threshold accuracy metric, or (2) the computed aesthetic metric is less than or equal to a threshold aesthetic metric:

generating a seed artifact indicative of a next action to be performed in response to receiving the first image generation prompt;

based on the generated seed artifact, generating a third image approximating the target image by applying the image generation model to the generated second image; and transmitting the generated third image to the first user device to enable display of the generated third image at a user interface of the first user device.

17. The method of claim 16, wherein computing, for the second image, the accuracy metric comprises:

determining a token within the first image generation prompt, wherein the token comprises a set of alphanumeric characters representing an object in the target image;

computing a probability that the second image includes a depiction of the object associated with the token by applying an image recognition model to the second image; and computing the accuracy metric based on the probability.

18. The method of claim 16, wherein computing, for the second image, the accuracy metric comprises:

generating a label for the second image by applying an image labeling model to the second image, wherein the label comprises an alphanumeric string indicating a description of the second image; and computing the accuracy metric based on comparing the label for the second image with the first image generation prompt.

19. The method of claim 16, wherein computing, for the second image, the aesthetic metric comprises generating the aesthetic metric based on applying an aesthetic evaluation model to the second image, wherein the aesthetic evaluation model is trained to output aesthetic metrics based on at least one of: depth of field, lighting, position, focus, contrast, color, and brightness.

20. The method of claim 16, wherein computing, for the second image, the aesthetic metric comprises:

extracting descriptive tokens from the first image generation prompt, wherein the descriptive tokens indicate aesthetic qualities of the target image;

generating indicators of one or more aesthetic properties for the second image by applying an aesthetic recognition model to the second image, wherein the aesthetic recognition model is trained to output text describing aesthetic properties for input images; and computing the aesthetic metric based on comparing one or more of the descriptive tokens with the indicators of the one or more aesthetic properties.

\* \* \* \* \*